Dec. 22, 1936.  B. T. WIECHERS  2,065,297
FLEXIBLE CONDUIT CONNECTER
Filed July 22, 1935
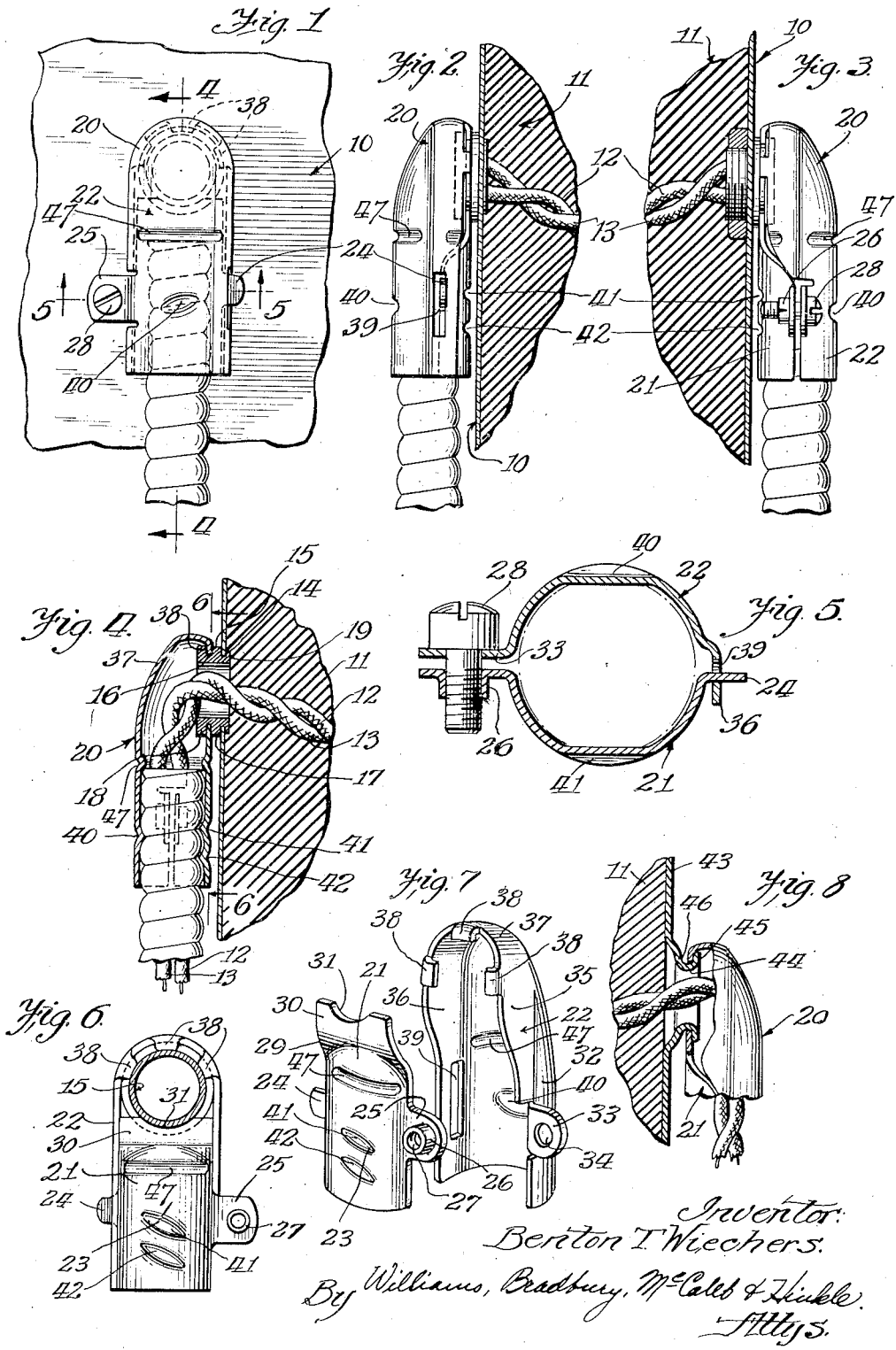
Inventor:
Benton T. Wiechers.
By Williams, Bradbury, McCaleb & Hinkle
Attys.

Patented Dec. 22, 1936

2,065,297

UNITED STATES PATENT OFFICE 2,065,297

FLEXIBLE CONDUIT CONNECTER

Benton T. Wiechers, Racine, Wis., assignor to Webster Electric Company, Racine, Wis., a corporation of Wisconsin Application July 22, 1935, Serial No. 32,569

2 Claims. (Cl. 247—25)

The present invention relates to flexible conduit connecters, and is particularly concerned with connecters of the elbow type for connecting the flexible conduit to an outlet box or switch box or a housing, such as a transformer housing.

In the devices of the prior art, the conduit connecters are customarily provided with a threaded member which projects through the aperture in the box, and a nut is mounted on the inside of the box to clamp the connecter to the box. Where such connecters are used on transformer housings, such as those for ignition transformers, the housing is customarily filled with a compound in which the nut is embedded, and if the elbow is secured in one position and it is discovered that the elbow should go off in a different direction, it is impossible to turn the elbow without loosening this connection to the box because the nut is embedded in the compound.

One of the objects of the invention is the provision of an improved flexible conduit connecter of the elbow type, in which the elbow may be moved to any rotative position with respect to the outlet box or the housing to which it is connected and secured there without any chance of the connecter becoming loose.

Another object of the invention is the provision of an improved flexible conduit connecter which is adapted to be secured to the outlet box and to the flexible conduit with a minimum amount of labor, by providing a structure adapted to the use of a single screw, the pressure of which is transmitted both to the clamping means for securing the flexible conduit and for securing the connecter on the box.

Another object of the invention is the provision of an improved flexible conduit connecter, which may be constructed at a low cost, which is efficient, sturdy, and involves a minimum amount of machine operation in its manufacture.

Other objects and advantages of the invention will be apparent from the following description and the accompanying drawing, in which similar characters of reference indicate similar parts throughout the several views.

Referring to the single sheet of drawings,

Fig. 1 is an elevational view of a connecter constructed according to the present invention;

Fig. 2 is a side elevational view, with the transformer housing and conduit in section;

Fig. 3 is a view similar to Fig. 2, taken from the opposite side, of a modification;

Fig. 4 is a sectional view, taken on the plane of the line 4—4 of Fig. 1;

Fig. 5 is an enlarged transverse sectional view, taken on the plane of the line 5—5 of Fig. 1, looking in the direction of the arrows;

Fig. 6 is a sectional view, taken on the plane of the line 6—6 of Fig. 4, looking in the direction of the arrows;

Fig. 7 is an exploded view of the two parts of the elbow connecter; and

Fig. 8 is a fragmentary sectional view of a modification.

Referring to Figs. 1 to 4, 10 indicates in its entirety the wall of the transformer housing or outlet box, which in the present embodiment is filled with a compound 11 surrounding the transformer and the conductors 12, 13.

The wall 10 is provided with an aperture 14, within which is riveted a ferrule 15 that is provided with a groove 16 in its outer cylindrical surface 17. This forms an annular retaining flange 18 for engaging beyond the connecter parts. The reduced cylindrical portion of the ferrule 15 is riveted over at 19 inside the box, and thus the ferrule is fixedly secured to the wall 10.

The connecter is indicated in its entirety by the numeral 20, comprising the two parts 21 and 22, shown in Fig. 7. The lower half 21 of the connecter may comprise a metal plate having a partially cylindrical portion 23 and a pair of laterally projecting ears 24 and 25. The ear 25 may be provided with a pressed tubular formation 26 surrounding the threaded bore 27, which is adapted to receive the screw bolt 28. The member 21 is provided with an offset at 29 so as to bring the end flange 30 down into the plane of the groove 16, and to space the curved body 23 from the wall 10.

The end flange 30 is formed with a partially circular groove 31 for engaging in the groove 16 of the ferrule 15. The other half 22 of the connecter 20 may comprise a stamped metal member, which is formed with a partially cylindrical portion 32, which also has a laterally projecting ear 33 having an aperture 34 for the screw bolt 28. The part 22 is longer than the part 21 by the diameter of the ferrule 15, as it is adapted to extend over the end of the ferrule, and it is provided with the side walls 35, 36 and the cylindrical end wall 37, which surrounds the ferrule. The ribs 47 on the top and bottom halves of the connecter serve as definite stops for limiting the axial movement of the conduit in the connecter.

Side walls 35, 36 and end wall 37 are provided with the inwardly extending flanges 38, which are adapted to engage in the groove 16 when the aperture 34 is aligned with aperture 27, and the end 31 of member 21 is also in the groove 16. The side wall 36 is also provided with a slot 39 for receiving the ear 24.

The upper half 22 is preferably provided with a transverse inwardly extending rib 40, and the lower half 21 may be provided with one or more inwardly extending ribs 41, 42, these ribs being suitably located so that when rib 40 engages in the groove of the flexible conduit both the ribs 41 and 42 are so located as to engage in grooves below the conduit. These ribs preferably extend at a slight angle, the angle corresponding to the angle of the thread of the flexible conduit so that the ribs comprise portions of threads into which the flexible conduit may be screwed when the parts are assembled.

The ears 24, 25, 33 and slot 39 are preferably located midway between the ribs 40—42 and the groove-engaging flanges 31, 38 so that the screw 28 may draw both of these members tightly against its associated parts. In other words, when screw 28 is tightened and members 21 and 22 are drawn toward each other, the flexible conduit 43 is clamped at the lower end of Fig. 4, and the parts of the ferrule 15 are also clamped between the flanges 31 and 38 at the upper part of the connecter. Flange 31 would be drawn toward the flange 18 of the ferrule, while the flanges 38 would be forced against the opposite side of groove 16 of the ferrule 15, and the connecter can be tightly clamped upon the ferrule and conduit by means of the single screw 28.

Referring to Fig. 8, this is a modification in which the housing wall 43 of the transformer casing or the outlet box is provided with a stamped tubular formation 44 having an outwardly turned flange 45 forming the groove 46. In other modifications the ferrule may be provided with threads and with a nut for securing it to the housing, as shown in Fig. 3.

This structure differs from the preceding one only in the fact that the ferrule is an integral part of the wall.

It will thus be observed that I have invented an improved connecter which is adapted to be turned to any rotative position without affecting its securement to the outlet box or housing. The elbow may be clamped in any rotative position, and the clamping is effected by means of a single screw, which not only clamps the flexible conduit, but secures the elbow at any predetermined angle.

The present device may be constructed with a minimum amount of machine work, and the two parts thereof may be manufactured by stamping and punching operations.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States, is:

1. In a flexible conduit elbow, the combination of a tubular member provided with a peripherally extending groove forming a retaining shoulder, a clamping member comprising a plate formed with a curved flange for engaging in one side of said groove, a substantially hemi-cylindrical clamping member formed with inwardly extending flanges at one end for engaging in said groove, said hemi-cylindrical clamping member having a slot for receiving a flange carried by said clamping member, and single threaded means for drawing said two clamping members together.

2. In a flexible conduit elbow, the combination of a tubular member provided with a peripherally extending groove forming a retaining shoulder, a clamping member comprising a plate formed with a curved flange for engaging in one side of said groove, a substantially hemi-cylindrical clamping member formed with inwardly extending flanges at one end for engaging in said groove, said hemi-cylindrical clamping member having a slot for receiving a flange carried by said clamping member, and single threaded means for drawing said two clamping members together, said two clamping members having inwardly extending ridges forming partial threads for engaging a flexible conduit.

BENTON T. WIECHERS.